United States Patent Office 3,518,535
Patented June 30, 1970

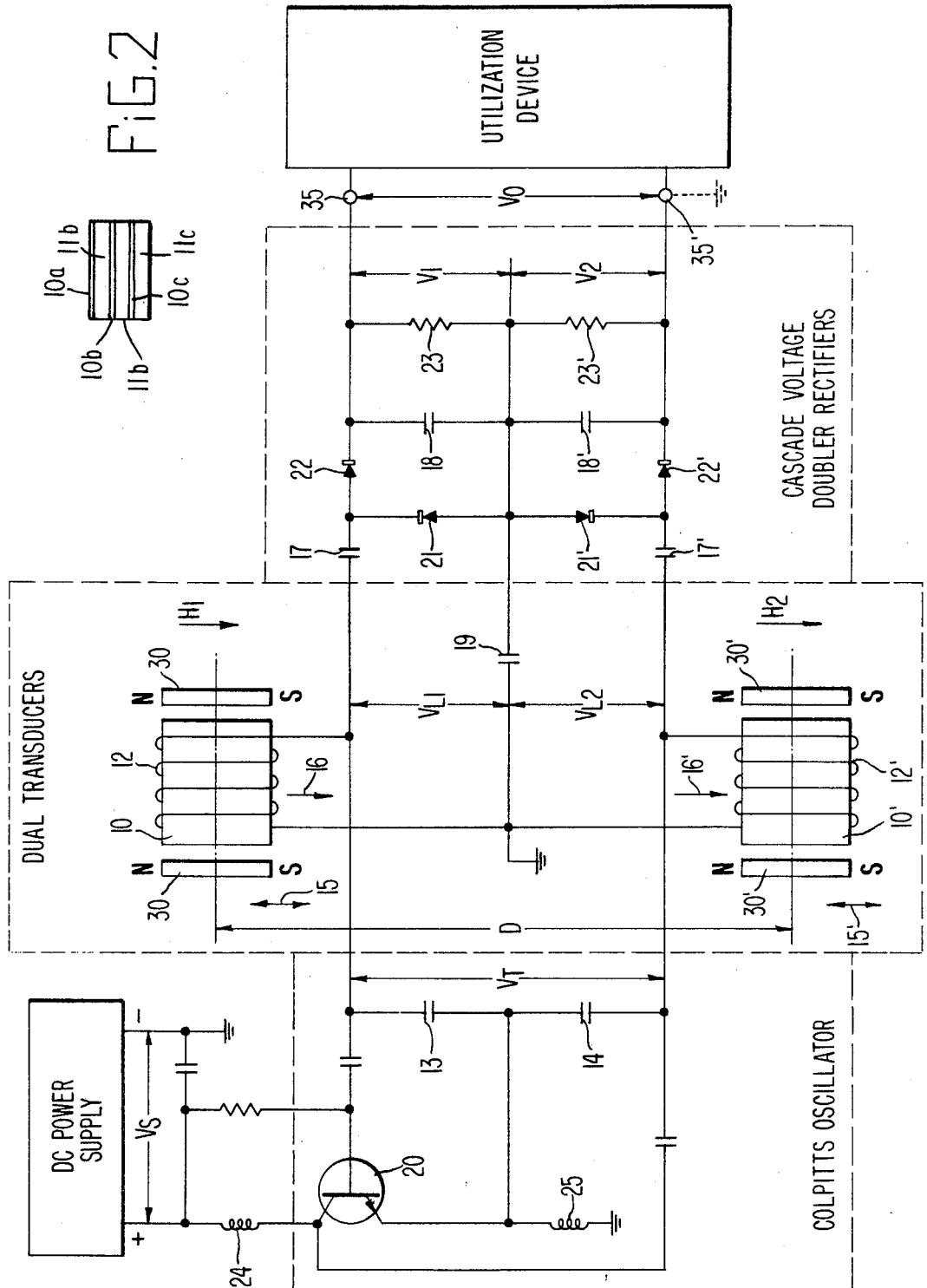

3,518,535
THIN FILM GRADIOMETER WITH TRANSDUCER WINDINGS CONNECTED IN SERIES AS PART OF THE RESONANT CIRCUIT OF THE ENERGIZING SOURCE
Wilmer S. Powell, Berwyn, Pa., assignor to Burroughs Corporation, Detroit, Mich., a corporation of Michigan
Filed Feb. 27, 1968, Ser. No. 709,590
Int. Cl. G01r 33/02
U.S. Cl. 324—43
9 Claims

ABSTRACT OF THE DISCLOSURE

The present disclosure describes a gradient magnetometer for comparing the magnetic field strengths at two spatially separated points. The magnetometer utilizes a self-controlled oscillator for generating a constant radio frequency voltage, a pair of thin magnetic film transducers magnetically biased to the same sense and circuits for providing an output signal having an amplitude which is substantially proportional to the magnetic field gradient and to the transducer spacing and having a polarity corresponding to the sense of the gradient.

CROSS REFERENCES TO RELATED APPLICATONS

The basic thin magnetic film inductance variation mode of magnetometer transducer action has been described and claimed in copending application for U.S. Pat. Ser. No. 449,183, now U.S. Pat. No. 3,416,072, entitled "Thin Film Magnetometer Employing Phase Shift Discrimination", filed Apr. 19, 1965, in the names of Richard L. Fussell and Clifford J. Bader and assigned to the same assignee as the present application. In this copending application, it was disclosed that a simple, low power, sensitive, magnetic field sensing device could be realized by exploiting the dependence of the thin film permeability in a "hard" direction transverse to the "easy" or preferred axis of magnetization of the film, on a magnetic field component, directed along the film's preferred or "easy" axis. Moreover, it was taught that measurement of an ambient field could be accomplished by using the thin film inductance as part of a resonant tank circuit in conjunction with circuits which produce an output proportional to changes in the resonant frequency of the tank.

In another copending application for U.S. Pat., Ser. No. 543,097, now U.S. Pat. No. 3,443,213 entitled "Magnetometer Using Thin Film Transducer as Slope Detector Filter", filed Apr. 18, 1966, in the names of Clifford J. Bader, Richard L. Fussell, and Arthur G. Barnett, assigned to the same assignee as the present application, there is taught and claimed a magnetometer system comprising a thin film transducer tank circuit employed as a slope-detection filter and excited from a constant frequency source.

A third copending application which is closely related to the present application is Ser. No. 691,901 entitled "Thin Magnetic Film Magnetometer," filed Dec. 19, 1967, in the name of Clifford J. Bader, and also assigned to the common assignee. In this last-mentioned copending application there is disclosed and claimed a pair of thin magnetic films, physically arranged so that they have a common easy or sensitive axis and are magnetically biased to opposite states of residual flux density along said axis. The output signal of this magnetometer is indicative of the direction and strength of the magnetic field applied to the transducers.

SUMMARY OF THE INVENTION

The thin film magnetometer of Ser. No. 691,901 has been described as being especially suited for applications requiring extreme ruggedness and long term untended operation. Moreover it was noted that no initial or periodic adjustments of the device are necessary. Also regarded as a most important consideration is that while the magnetometer employs a self-controlled oscillator, the precise frequency of oscillation is immaterial in that it is not a factor in determining the output signal level.

In principle, a gradient magnetometer is simply a combination of two complete magnetometer sensors, arranged to compare the magnetic field strength at two points in space separated by a predetermined distance. The magnetometer of the present invention is somewhat similar in configuration to the magnetometer of Ser. No. 691,901 and possesses all of the aforementioned advantages of the latter. However, it differs therefrom in important modifications necessary to permit gradient field sensing and accomplishes such sensing without the need for employing two complete magnetometer units. The desired effect is obtained by the present invention in a single unit and is accomplished by using a pair of thin magnetic film transducers, physically separated from each other by a predetermined distance but having their respective easy or sensitive axes oriented in the same direction. Additionally the thin film elements are magnetically biased to the same state of residual flux density along said axes. The transducers electrically connected across a source of constant radio-frequency (RF) voltage. The RF voltages appearing across each of the transducers in response to a magnetic field applied concurrently thereto, are combined in detector circuits which produce the desired DC output signal indicative of the sense and magnitude of the field gradient.

BRIEF DESCRIPTION OF THE DRAWING

FIG. 1 is a semischematic representation of an operative embodiment of the present invention and illustrates an oscillator, dual thin magnetic film transducers and the output circuits.

DESCRIPTION OF THE PREFERRED EMBODIMENT

Before proceeding with a description of FIG. 1, which shows an actual operative embodiment of the gradient magnetometer, it is believed helpful to the reader if both the nature of the thin magnetic films and the transducer action utilized in the present invention and those of the referenced copending applications are reviewed in some detail.

Thin magnetic films have been produced by depositing a nickel-iron alloy on a smooth substrate, such as glass, to a thickness of a few hundred to several thousand angstroms. A number of deposition processes, including evaporation in a vacuum and electroplating may be employed. In the evaporative process the deposition of the magnetic material on a glass substrate requires the application of a conductive coating on the glass prior to deposition. In general, the characteristics discussed hereafter apply to films deposited by either of these processes, although in electroplated films consideration must be given to the possible high-frequency eddy-current effects in the required conductive underlayer.

In general, predictable and stable magnetic properties of the films are obtained by choosing an alloy composition which yields minimum magnetostriction coefficient. For the nickel-iron film, the optimum composition appears to be approximately 83% Ni, 17% Fe. It has been found experimentally that if the actual composition of the films differs from this ratio by more than a few percent, the film magnetic properties are unduly sensitive to stresses induced by thermal expansion of the substrate or by external forces.

Films of thicknesses up to at least 3,000 angstroms exhibit the capability of eristing as a single domain, the magnetization of which can be rotated from a preferred or "easy" direction of magnetization by the application of external fields. This "easy axis" anisotropy is produced in the films by the presence of a large uniform field during the evaporation process which causes the magnetic domains of the alloy to align in a preferred direction.

The magnetic characteristic of thin films in the preferred direction exhibits a substantially rectangular hysteresis loop. In a direction transverse to the easy direction, often referred to as the "hard" direction or axis, the magnetic characteristic is a substantially linear loop. If the film sample under test is continually rotated from the easy to the hard direction, the magnetic characteristic changes from the square loop to the linear loop without interruption. Based upon these characteristics, two magnetic parameters $H_C$ and $H_K$ are obtained. $H_C$ is the coercive field value (coercivity) evaluated from the rectangular hysteresis loop in the easy direction; $H_K$ is the anisotropy field or saturation magnetization force in the hard direction. As distinguished from rotation, magnetic thin films may also exhibit magnetization reversal by domain wall motion in the presence of an easy direction applied field greater than the film coercive force, $H_C$. In the absence of an external magnetic field, single domains can only exist in these films if the size of the film spot is sufficiently large to keep the demagnetizing fields at the edges below the wall-motion threshold of, typically, one to two oersteds.

If a field equal to or larger than $H_K$ is applied in the plane of the film perpendicular to the easy axis it is found that in the absence of an easy direction field, the film magnestization in a given portion of the film is equally likely to return to the easy axis with positive and negative senses; consequently, the magnetization tends to split into multiple domains and the original single-domain state no longer exists until an easy-direction field exceeding $H_C$ is applied.

With reference to FIG. 1, and as taught in said copending application, consider one of the dual transducers, L1. If a winding 12 is placed around a thin magnetic film 10 in such a manner that the coil axis coincides with the hard direction axis of magnetization, the inductance is found to be dependent upon the static magnetic environment represented by field $H_1$ applied to the thin film magnetization in a given portion of the film is equally rection of the film 10 is indicated by the double-headed arrow 15. When the RF exciting current caused to flow through winding 12 is maintained at a level which limits the perturbation of the film magnetization vector angle to a few degrees, and if the external fields under observation are confined to values less than the anisotropy field $H_K$ or the coercive force $H_C$, the inductance variation of the transducer is predictable and reversible.

FIG. 1 of the present invention illustrates a pair of thin film transducers L1 and L2, separated by a distance, D, and physically arranged so that they have common direction, sensitive, easy direction axes 15 and 15'. Means are provided to magnetically bias the thin films 10 and 10' in the same sensor state of residual flux density. In FIG. 1 such biasing means are pictorially illustrated as two pairs of rod or bar magnets 30, 30', but it should be apparent that other bias means may be satisfactorily employed and the invention is not to be considered limited to the use or illustrated arrangement of such magnets. With the configuration of thin film transducers and magnetic bias means depicted in FIG. 1, it is observed that the presence of magnetic fields $H_1$ and $H_2$, applied in the same direction as the bias fields as shown, will cause the inductances of both transducers to decrease. Alternately, applied magnetic fields in a direction opposite to the bias fields will result in an increase in the inductances of both transducers. If the fields, $H_1$ and $H_2$ are of equal strength, the inductance values of the transducers will change by equal amounts.

Since the two transducers are electrically connected in series and are placed across a constant radio frequency (RF) voltage, $V_T$, the voltages $V_{L1}$ and $V_{L2}$ across the inductances of transducers L1 and L2 respectively will be given by $$V_{L1} = \left(\frac{L1}{L1+L2}\right) V_T$$

$$V_{L2} = \left(\frac{L2}{L1+L2}\right) V_T$$

If the $V_{L1}$ and $V_{L2}$ RF voltages are rectified and the resulting DC voltages are arranged to oppose each other, the output voltage $V_O$ of the gradient magnetometer will be $$V_O = K(V_{L1} - V_{L2}) = K T_T \left(\frac{L1-L2}{L1+L2}\right)$$

where K is an RF to DC conversion factor.

If, as postulated above, the two fields $H_1$ and $H_2$ are equal, then $L_1 = L_2$ and $V_O = 0$. That is, with identical thin film transducers, there is no common-mode response.

On the other hand, if the fields $H_1$ and $H_2$ are unequal, they may be represented as $$H_1 = H_A - \Delta H$$
$$H_2 = H_A - \Delta H$$

where $H_A$ is the average field and is equal to $$\frac{H_1 + H_2}{2}$$

The inductance of each transducer is found to obey the relationship $$L = L_A + \frac{L_M H_K}{H_K + H_B + H_A}$$

where $H_K$ = anistopropy field
$H_B$ = bias field
$L_A$ = air inductance
$L_M$ = inductance due to magnetic field for $H_B = H_A = 0$ Replacing $H_A$ by the appropriate expression for $H_1$ and $H_2$ yields, $$L_1 - L_2$$
$$= L_M H_K \left(\frac{1}{H_K + H_B + H_A - \Delta H} - \frac{1}{H_K + H_B + H_A + \Delta H}\right)$$

For $\Delta H \ll H_K + H_B + H_A$, $$L_1 - L_2 \approx \frac{L_M H_K (2\Delta H)}{(H_K + H_B + H_A)^2}$$

$$L_1 + L_2 \approx 2\left[L_A + \frac{L_M H_K}{(H_K + H_B + H_A)}\right]$$

and $$V_O = K(V_{L1} - V_{L2}) = K V_T \left(\frac{L_1 - L_2}{L_1 + L_2}\right)$$

$$V_O = \frac{L_M H_K (\Delta H)}{[(H_K + H_B + H_A) L_A + L_M H_K](H_K + H_B + H_A)}$$

From the foregoing, it is seen that the output voltage $V_O$ which results from a difference of $2\Delta H$ in the fields $H_1$ and $H_2$ depends somewhat on the average field $H_A$. This implies that the sensitivity of the device is not strictly a constant. However, if the transducers are perfectly matched, the common mode response, that is, $V_O$ due to $H_A$ with $\Delta H = 0$, is still zero.

In the preferred embodiment of FIG. 1, the constant voltage drive for the thin magnetic film transducers is provided by a Colpitts oscillator. The oscillator resonant circuit comprises the combination of the total inductance of the transducers, and capacitors 13 and 14. Two RF chokes, 24 and 25 are provided to isolate the oscillator from the DC POWER SUPPLY, thereby permitting the grounding of the common center point of the two transducers. Transistor 20 which is of the NPN conductivity type, operates as a Class C oscillator stage—such oscillators characteristically providing a peak RF resonant tank voltage which is constant and approximately equal to the DC supply voltage $V_S$.

The output voltage $V_T$ appearing across the oscillator tank circuit is applied to the two thin film transducers L1 and L2 which are indicated pictorially in the drawing. Transducer L1 comprises a thin magnetic film 10, and winding 12 wound therearound. Two rod permanent magnets 30 are illustrated in proximity to the thin magnetic film 10 for applying a magnetic bias thereto in a direction indicated by arrow 16. The lower transducer comprising thin film 10' and winding 12' is identical to the upper transducer. The rod magnets 30' which are associated with transducer L2 are the same in polarity with respect to magnets 30 of transducer L1, with the result that the transducers are biased in the same sense. The direction of the magnetic bias applied to thin film 12' is indicated by arrow 16'.

Since the voltages $V_{L1}$ and $V_{L2}$ appearing across the respective thin magnetic film transducers are RF signals, some means of rectification is necessary to convert them to the desired DC output. In the drawing, rectification is accomplished by the use of two series-connected cascade voltage doublers, the circuit configuration of which is familiar to those skilled in the electronics art. Other rectifier circuits may be employed with satisfactory results, and the present invention is not to be considered limited to any one of them. A first voltage doubler rectifier operatively connected to receive the voltage $V_{L1}$ of transducer L1 comprises capacitors 17 and 18, diodes 21 and 22, and resistor 23. The DC output voltage $V_1$ appearing across resistor 23 is approximately equal to twice the value of $V_{L1}$. Capacitor 19 serves to establish an AC reference point by bypassing the RF signals directly to ground. Similarly, the second voltage doubler is adapted to receive voltage signal $V_{L2}$ from transducer L2, and comprises capacitors 17', 18', diodes 21', 22', and resistor 23'. The DC voltage across resistor 23' is approximately equal to $2V_{L2}$. The polarities of the diodes used in the rectifier circuits have been arranged to give the desired subtractive effect. Therefore the output of the magnetometer, $V_O$ appearing across terminals 35–35' is applied to the UTILIZATION DEVICE, which in its simplest form may be a galvanometer. $V_O$ is approximately equal to the difference of the voltages appearing respectively across resistors 23 and 23'. Thus $$V_O \approx V_1 - V_2$$

$$V_O \approx 2V_S \left(\frac{L_1 - L_2}{L_1 + L_2}\right)$$

$V_S$ is the DC POWER SUPPLY potential.

As is apparent from FIG. 1, the output voltage $V_O$ is not internally referenced to any particular level. The dotted jumper connection from terminal 35' indicates a possible ground reference. This feature allows greater versatility in those circumstances where the sensor output voltage is to be modified by additional circuits, such as amplifiers, prior to being applied to the utilization device.

The sensitivity of the basic magnetometer, may be increased by the use of a plurality of thin magnetic films and substrates per transducer, or by the use of thicker films. For example, as many as six magnetic films, each having a thickness of 2500 A., have been used in each of the dual transducers to fulfill the higher sensitivity requirement of specialized applications. FIG. 2 depicts a transducer comprised of three thin magnetic films 10a, 10b, 10c and their respective substrates 11a, 11b and 11c. The sensitivity of the present gradient magnetometer is difficult to specify since it depends on the transducer spacing as well as the degree of thin film response to the applied fields. Since the latter may reasonably be on the order of 0.5 volt per oersted, we may estimate that a spacing of 10 centimeters should yield approximately 50 millivolts for a gradient of 1 oersted per meter.

It was pointed out in the referenced copending application, Ser. No. 691,901, that in the disclosed magnetometer, any nonlinearity of the transducer inductance versus field relationship is substantially cancelled by the action of the opposite-biased dual transducers. Such self-compensation is not available in the present gradient magnetometers since the transducers are necessarily biased to the same sense. Thus, the gradient sensitivity will vary to a certain degree with the ambient field magnitude, although the balance of the device will not be affected. Such sensitivity change can be tolerated in a wide range of applications and will not reduce the effectiveness of the device for detecting field anomalies due to the presence of permeable objects.

It should be noted that the sensitive axes of the transducers may be oriented to respond to fields applied in directions other than that indicated in the drawing. For example, it may be assumed that the dimensional line D indicating the distance between the transducers lies along an $x$ coordinate. The transducers are thus depicted as responding to fields ($H_x$) applied along this coordinate. Alternately however, the sensitive axes of the transducers may be arranged to sense fields ($H_y$ or $H_z$) respectively along $y$ or $z$ coordinates, depending upon the particular application of the device. In any case, if the separation between the transducers is a distance D, the difference in the applied fields $2\Delta H$ sensed by the transducers may be given by the expression $$2\Delta H = \frac{\partial H}{\partial x} D$$

which implies that $2\Delta H$ is equal to the rate of change of the particular field component H being sensed per unit distance along the $x$ axis as assumed above, multiplied by the total transducer spacing "D."

As mentioned hereinbefore, a very important aspect of the voltage mode of operation of the present device is its complete freedom from drift due to oscillator frequency variation. Although it is desirable to utilize radio frequency signals in the order of 10–20 mHz. in order to develop operating voltages across the transducers at reasonable current levels, the actual frequency of the signal is unimportant. A review of the equations presented hereinbefore relating magnetometer output voltage to applied fields reveals that the equations contain no terms involving frequency.

The determination of the circuit constants of the configuration illustrated in FIG. 1 is well within the skill of the electronic circuit designer who will choose them in accordance with the particular application of the device. In an actual operative embodiment, the circuit constants chosen yielded an oscillator frequency of 14 mHz. Obviously, the transducer inductance values will determine an optimum operating frequency. The total DC current drain for the circuit shown in FIG. 1 is about 235 microamperes from a 4-volt power supply.

I claim:
1. In a gradient magnetometer, dual transducers situated in spaced-apart relation and comprised of magnetic films capable of assuming opposed states of residual flux density along common easy axes of magnetization, bias means positioned in proximity to said magnetic films for magnetizing said films in the same predetermined one of said states, said films existing as substantially single domains of said predetermined state, a pair of coils associated respectively with said transducers and wound about said films in such a manner that the coil axes are parallel to the hard axes of magnetization of the films, said coils being electrically connected in series relationship and having their common point returned to a reference potential, a controlled source of alternating current having a resonant circuit which includes said pair of coils, said coils being adapted to be energized from said controlled source of alternating current whereby the magnetization of said films is disturbed but said single domain configurations remain substantially unaltered, the respective inductance values of said dual transducers varying in the same sense by amounts determined by the respective magnetic field components applied concurrently to said transducers in a direction substantially parallel to the easy axes of said magnetic films, the alternating current voltages developed across said coils by said controlled source of alternating current being of the same frequency as said source and varying directly as a function of said respective inductance values.

2. In a magnetometer as defined in claim 1 said bias means comprising a plurality of permanent magnets, physically oriented to apply bias magnetic fields of the same polarity to the respective transducers.

3. In a magnetometer of the character defined by claim 1, further including means for comparing said alternating current voltages developed across said coils and for deriving from the comparison an output signal indicative of the field gradient present between the respective magnetic field components applied concurrently to said transducers.

4. A gradient magnetometer comprising a pair of spaced-apart ferromagnetic thin film devices capable of assuming opposed states of residual flux density along a common easy direction of magnetization, magnetic bias means positioned in proximity to said thin film devices for magnetizing said devices to the same state of residual flux density, said devices existing as substantially single domains of said last mentioned state, a pair of inductor windings disposed respectively about said devices in such a manner as to link the thin film magnetic flux in the hard direction of magnetization, said inductor windings being electrically connected in series relationship and having their common point returned to a reference potential, a source of radio frequency current having a resonant circuit which includes said inductor windings, said windings being adapted to be energized from said source of radio frequency current controlled in amplitude so as to limit the perturbation of the magnetization of said devices to small angular rotations incapable of altering said single domain configurations, said thin film devices and their associated inductor windings comprising inductances having values dependent upon the respective components of the external magnetic field environment to which said devices are concurerntly subjected along said easy direction of magnetization, the inductance values of the pair of thin film device and inductor winding combinations varying in the same sense with respect to each other in response to said components of said external field environment, the radio frequency voltages developed respectively across the inductor windings by said radio frequency source varying directly as a function of said inductance values of said combinations, and rectifier means operatively connected to said inductor windings for converting said radio frequency voltages developed thereacross to a direct current signal having an amplitude approximately proportion to the field gradient of said external environment and to the spacing of said thin film devices, and having a polarity corresponding to the sense of said gradient.

5. A magnetometer as defined in claim 4 further characterized in that each of said thin film devices comprises a thin magnetic film element of a nickel-iron alloy composed substantially of 83% nickel and 17% iron, and having a thickness of approximately 2500 angstrom units.

6. A magnetometer as defined in claim 4 further characterized in that each of said thin film devices comprises a plurality of thin magnetic film elements, each being formed of a nickel-iron alloy composed substantially of 83% nickel and 17% iron, and each having a thickness of approximately 2500 angstrom units.

7. A magnetometer as defined in claim 4 further characterized in that said magnetic bias means comprise a pair of rod-type permanent magnets positioned in proximity to each of said thin film devices, said magnets being physically oriented with respect to said devices such that the bias fields supplied thereby are of sufficient magnitude and proper polarity to magnetize said thin film devices to the same state of residual flux density.

8. A magnetometer as defined in claim 4 further characterized in that said source of radio frequency current comprises a transistor connected in a Colpitts oscillator circuit.

9. A magnetometer as defined in claim 4 wherein said rectifier means comprises a pair of cascade voltage doublers operatively connected to respective ones of said inductor windings, each of said cascade voltage doublers comprising first and second capacitors, a pair of diodes and a resistor, said pair of diodes being connected in series and being poled in the same direction, said first capacitor being connected between one of said inductor windings and the common point of said series diodes, said second capacitor and said resistor being connected in parallel with each other and with the combination of said series diodes, said pair of voltage doublers being referenced to a common AC ground potential and being interconnected such that the DC voltages developed across the respective voltage doubler resistors are subtractive, said direct current signal representing the difference of said last mentioned DC voltages, and means for utilizing said signal.

References Cited

UNITED STATES PATENTS

| | | | |
|---|---|---|---|
| 3,239,754 | 3/1966 | Odom et al. | 324—47 |
| 3,416,072 | 12/1968 | Fussell et al. | 324—43 |
| 3,421,075 | 1/1969 | Belson | 324—43 |
| 3,443,213 | 5/1969 | Bader et al. | 324—43 |

GERALD J. STRECKER, Primary Examiner

R. J. CORCORAN, Assistant Examiner

PO-1050
(5/69)

UNITED STATES PATENT OFFICE
CERTIFICATE OF CORRECTION

Patent No. 3,518,535      Dated   June 30, 1970

Inventor(s)   W. S. Powell

It is certified that error appears in the above-identified patent and that said Letters Patent are hereby corrected as shown below:

Column 2, line 43, insert as new paragraph --Fig. 2 is a pictorial view of a transducer suitable for use in the present invention and is comprised of a plurality of thin magnetic films and their associated substrates arranged in a sandwich-like configuration. --. Column 2, line 59, after "substrate" insert --may be made directly, whereas electroplating on a glass substrate-- . Column 3, line 50, delete "magnetization in a given portion of the film is equally" and insert --parallel to its easy axis. The easy axis or preferred di-- . Column 3, line 64, change "sensor" to --sense or-- . Column 4, line 20, "$KT_T$" should read --$KV_T$-- . Column 4, line 30, "$H_2 = H_A - \Delta H$" should read --$H_2 = H_A + \Delta H$-- . Column 8, line 5, "proportion" should read --proportional-- .

SIGNED AND
SEALED
OCT 13 1970

(SEAL)
Attest:

Edward M. Fletcher, Jr.
Attesting Officer

WILLIAM E. SCHUYLER, JR.
Commissioner of Patents